UNITED STATES PATENT OFFICE.

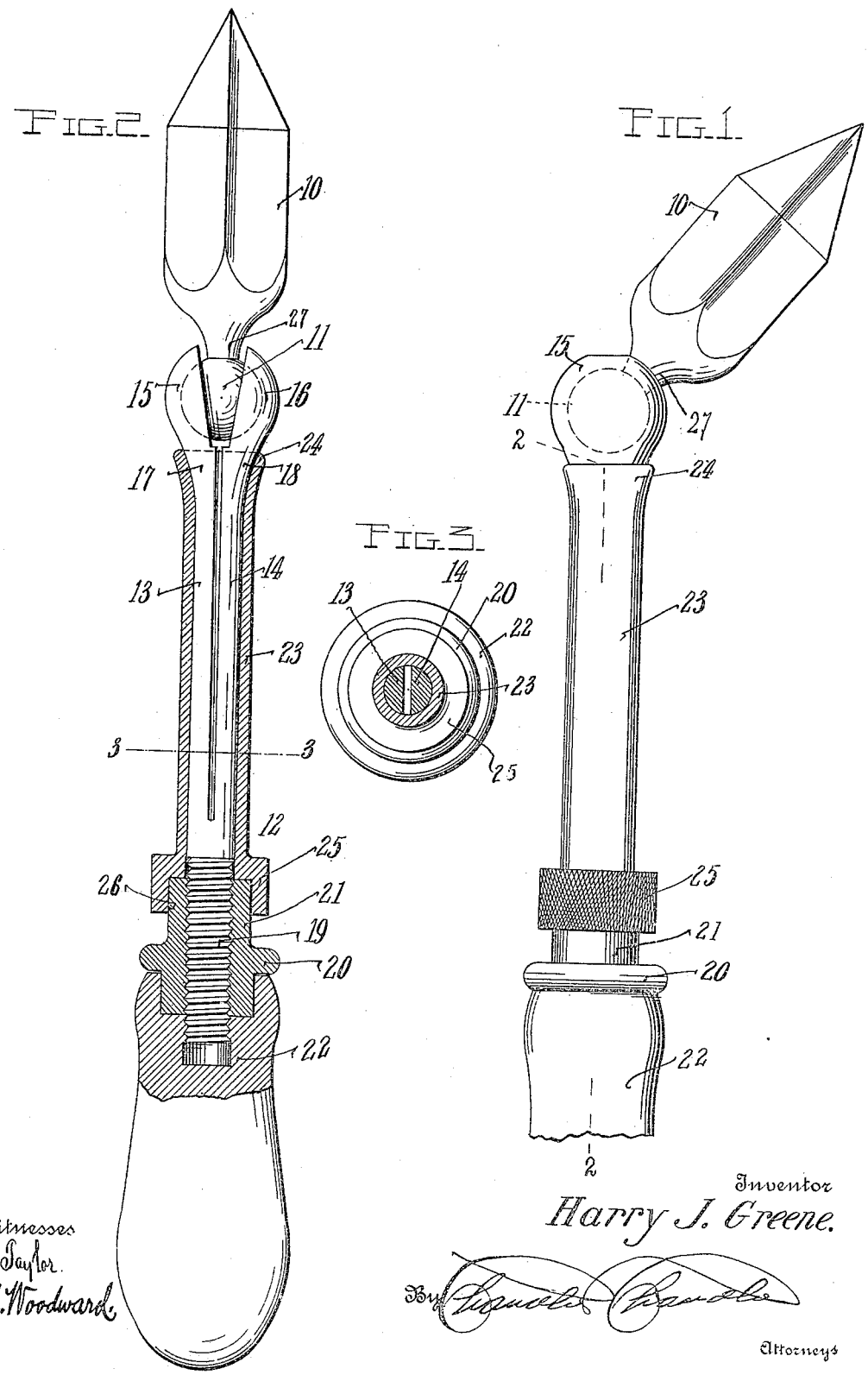

HARRY J. GREENE, OF NORTH BROOKSVILLE, MAINE.

SOLDERING IMPLEMENT.

957,327.     Specification of Letters Patent.     Patented May 10, 1910.

Application filed February 16, 1910. Serial No. 544,215.

*To all whom it may concern:*

Be it known that I, HARRY J. GREENE, a citizen of the United States, residing at North Brooksville, in the county of Hancock, State of Maine, have invented certain new and useful Improvements in Soldering Implements; and I do hereby declare the following to be a full, clear, and exact description of the invention, such as will enable others skilled in the art to which it appertains to make and use the same.

This invention relates to soldering implements, generally known as "soldering irons", and has for one of its objects to provide a simply constructed implement of this character wherein the head or soldering member is adjustable to dispose the same at any angle relative to the stock, to facilitate its operation and enable the implement to be employed in otherwise inaccessible localities.

With this and other objects in view, the invention consists in certain novel features of construction as hereinafter shown and described and then specifically pointed out in the claims.

In the drawings illustrative of the preferred embodiment of the invention, Figure 1 is an elevation of the improved device with the head member disposed at an angle to the stock, Fig. 2 is an elevation with the sleeve and the actuating mechanism in section on the line 2—2 of Fig. 1, Fig. 3 is a transverse section on the line 3—3 of Fig. 2.

The improved device comprises a head member 10 of the usual form which is generally square and pointed at one end, and in the improved device the other terminal is provided with a globular portion 11. The stock portion 12 of the improved device is formed in two divided portions 13—14 enlarged into half sockets 15—16 designed to embrace the globular member 11 from opposite sides and with the portion between the sockets and the members 13—14 diverging as shown at 17—18. At its opposite end the member 12 is threaded as shown at 19 and engaging the threaded portion of the stock is a clamp nut 20 having a cylindrical portion 21. The member 20 is fitted in any suitable manner firmly into a hand grip portion 22, as shown. The portions 13—14 of the stock are semi-cylindrical, and fitting around the stock is a relatively long sleeve 23 having an outwardly diverging portion 24 at one end fitting upon the diverging portions 17—18 of the stock member, so that when the sleeve 23 is moved longitudinally of the stock member it will exert a compressing force upon the sockets 15—16 and thus clamp the globular member between them, as hereinafter explained. At its opposite end the sleeve 23 is provided with a milled enlargement 25, having an internal annular cavity 26 fitting over the reduced portion 21 of the nut, as shown in Fig. 2. By this arrangement it will be obvious that when the handle member 22 with its nut 20 is rotated the stock 12 will be drawn into the sleeve 23 thereby causing the socket members 15—16 to be firmly clamped upon the globular portion 11 of the head, thus holding it firmly at any desired point to which it may be adjusted. The neck portion 27 between the head 10 and its globular portion 11 is of less diameter than the distance between the outer terminals of the sockets 15—16, so that the head may be turned downwardly at right angles to the stock and likewise rotated upon the globular portion as a bearing or located in any desired intermediate point, and firmly clamped at any point to which it may be adjusted, as will be obvious, by simply rotating the handle 22 and holding the sleeve 23 from rotation by pressure applied to the milled collar or projection 25. By this means a convenient implement is produced whereby otherwise inaccessible parts may be reached with the head member.

The improved device is simple in construction, can be inexpensively manufactured and of any required size and of any suitable material. The parts are readily separable for renewal or repairs of any impaired or broken part; and by furnishing a plurality of the heads 10 of different forms the scope of the implement may be materially increased without structural change in the operating parts.

What is claimed is:—

1. A soldering implement comprising a stock having a portion divided with confronting socket members at the terminals of the divided portion, a head having a globular terminal engaged by said socket members, a sleeve slidable upon said stock, a handle, and means operative by said handle for adjusting said sleeve longitudinally of said stock to compress said socket members upon said globular head portion and hold the head in any adjusted position.

2. A soldering implement comprising a stock having one portion threaded and the remaining portion divided with confronting socket members at the terminal of the divided portion, a head having a globular terminal engaged by said socket members, a sleeve slidable upon said stock, a handle, and a nut carried by said handle and engaging the threaded portion of the stock and rotatively engaging the sleeve.

In testimony whereof, I affix my signature, in presence of two witnesses.

HARRY J. GREENE.

Witnesses:
　EDMUND L. DAVIS,
　CHARLES WHITE.